United States Patent [19]

Monta

[11] Patent Number: 5,668,785
[45] Date of Patent: Sep. 16, 1997

[54] MULTIPLE AUDIO SIGNAL RECORDING AND REPRODUCING APPARATUS

[75] Inventor: Hiroki Monta, Ibaraki, Japan

[73] Assignee: Matsushita Electric Industrial Co., Ltd., Osaka, Japan

[21] Appl. No.: 461,528

[22] Filed: Jun. 5, 1995

Related U.S. Application Data

[62] Division of Ser. No. 156,101, Nov. 22, 1993, Pat. No. 5,594,551.

[30] Foreign Application Priority Data

Nov. 20, 1992 [JP] Japan ..................... 4-311755

[51] Int. Cl.$^6$ ..................... H04B 1/20
[52] U.S. Cl. ..................... 369/5; 369/4
[58] Field of Search ..................... 369/5, 4, 3, 89, 369/91, 86, 1; 381/11; 386/92, 95, 101

[56] References Cited

U.S. PATENT DOCUMENTS

| | | | |
|---|---|---|---|
| 4,306,114 | 12/1981 | Callahan ..................... | 369/5 X |
| 4,523,236 | 6/1985 | Hayashi et al. ..................... | 358/341 |
| 4,768,106 | 8/1988 | Ito et al. ..................... | 360/14.1 |
| 5,027,222 | 6/1991 | Shinbo et al. ..................... | 358/33 |
| 5,065,259 | 11/1991 | Kubota et al. ..................... | 360/32 |
| 5,132,807 | 7/1992 | Takimoto et al. ..................... | 358/335 |
| 5,150,218 | 9/1992 | Ezaki ..................... | 358/310 |
| 5,347,499 | 9/1994 | Woo ..................... | 369/4 |
| 5,594,551 | 1/1997 | Monta ..................... | 386/92 |

FOREIGN PATENT DOCUMENTS

| | | |
|---|---|---|
| 0507433 | 10/1992 | European Pat. Off. . |
| 2-96487 | 4/1990 | Japan . |
| 4-35477 | 2/1992 | Japan . |
| 4-170877 | 6/1992 | Japan . |

*Primary Examiner*—Ali Neyzari
*Attorney, Agent, or Firm*—Ratner & Prestia

[57] ABSTRACT

A recording/reproducing apparatus for recording and reproducing input signals having left and right stereo sounds. The stereo audio components of television signals prior to recording are data compressed and multiplexed. Then the stereo components are recorded in two channels, a left channel and a right channel. In playback, the audio signals are retrieved by the control signal from audio sound tracks of the recording medium.

2 Claims, 15 Drawing Sheets

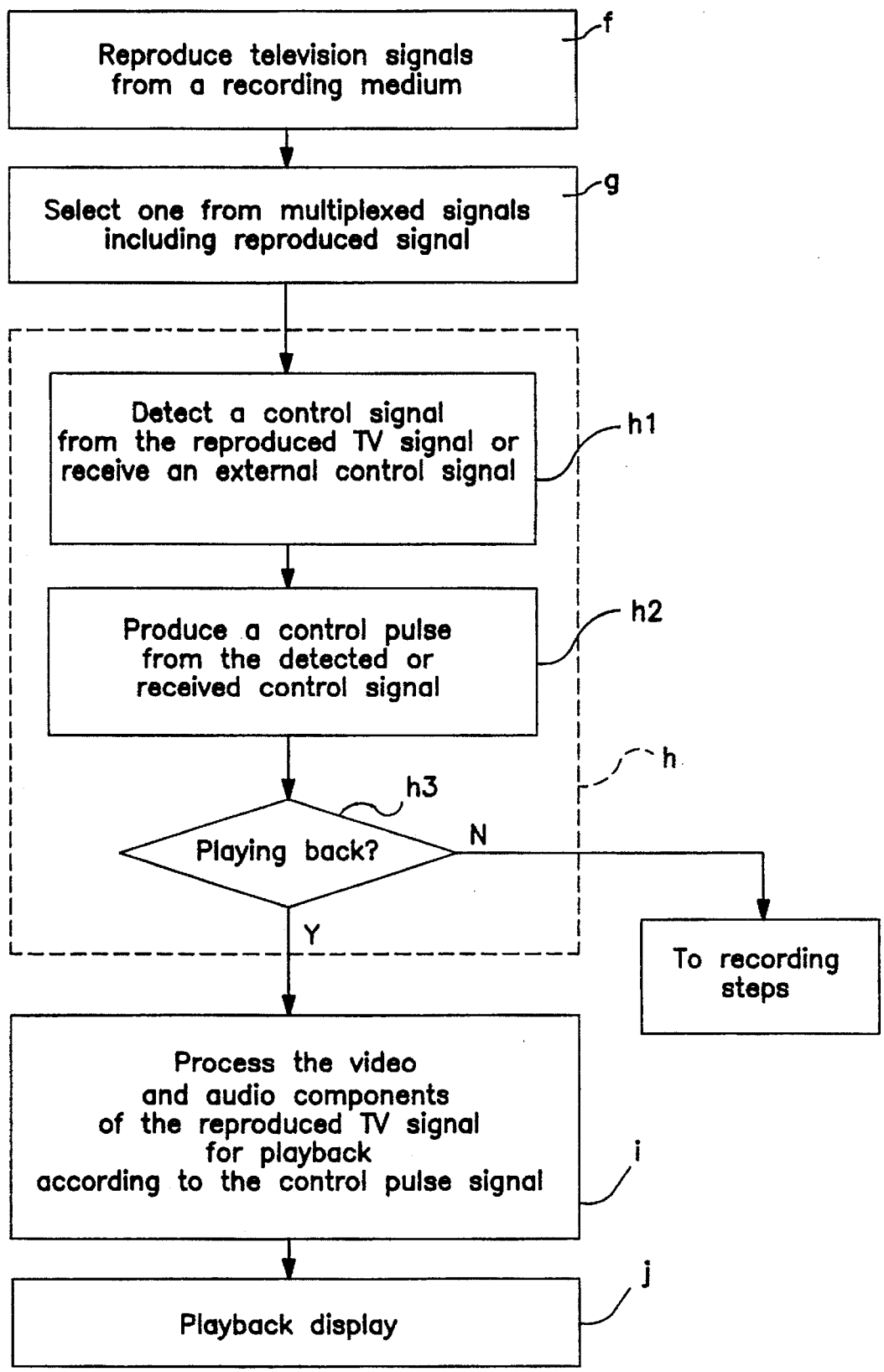
FIG. I(d)

recording video A video B signal processor 5 output
(A and B synchronized)

switch 7 output
(composite signal)

A1 ~ A5: field (or frame) data of video signal A.

B1 ~ B5: field (or frame) data of video signal B.

reproducing signal processor 5 input video A playback video B playback

A1 ~ A5: field (or frame) data of video signal A.

B1 ~ B5: field (or frame) data of video signal B.

MULTIPLE AUDIO SIGNAL RECORDING AND REPRODUCING APPARATUS

This application is a division of application Ser. No. 08/156,101, filed Nov. 22, 1993, now U.S. Pat. No. 5,594,551.

BACKGROUND OF THE INVENTION

The present invention relates to a method of recording a plurality of television signals of different programs and reproducing a desired program and to an apparatus for the same.

As satellite broadcasting services have expanded using broadcasting satellites (referred to as BS hereinafter) and communications satellites (referred to as CS), there has been an increase in service programs which often need multi-channel signal transmission. In a conventional home video tape recorder (VTR), one program can usually only be recorded at a time although the VTR can receive two or more programs which are transmitted on the multiple channels.

A technique of recording two or more programs at a time is known and is illustrated in FIG. 9(a). FIG. 9(a) is a block diagram of the apparatus capable of recording and reproducing three different audio/video signals at the same time. As shown, three input terminals 14A, 14B, and 14C are provided for receiving three different audio/video signals A, B, and C respectively. The input terminals are coupled to three input signal processors 15A, 15B, and 15C which are adapted for time dividing their respective audio/video signals A, B, and C into three rows of fields A1, B1, and C1. The input signal processors also produce three first control signals $\alpha1$, $\beta1$, and $\gamma1$ for specifying the three field components A1, B1, and C1 respectively.

A recording sync signal processor 16 responsive to the first control signals $\alpha1$, $\beta1$, and $\gamma1$ is provided for producing a second control signal $\alpha$ for determining an order for the three field components A1, B1, and C1 and a third control signal $\beta$ for identifying the three field components A1, B1, and C1. A recording signal processor 17 responsive to the second control signal $\alpha$ is provided for transmitting combinations of the field components A1, B1, and C1 grouped in a set of three different audio/video signals. A recorder unit 18 is provided for recording the field components A1, B1, and C1 and the third control signal $\beta$ in a given format on a magnetic recording tape as shown in FIG. 9(b).

During reproduction, a reproducing sync signal processor 21 responsive to the third control signal $\beta$, which has been reproduced and fed from the recorder unit 18, is provided for producing a fourth control signal $\Delta$. This signal identifies the field components A1, B1, and C1 to be reproduced at the recorder unit 18. A reproduced signal processor 19 responsive to the fourth control signal $\Delta$ is provided for allocating the reproduced field components A1, B1, and C1 supplied from the recording unit 18 to three discrete channels. The reproduced field components A1, B1, and C1 of the audio/video signals are then transmitted along their channels to three output signal processors 20A, 20B, and 20C, respectively. At this point the field components of each audio/video signal are joined one to the other. A switch 22 is provided for selecting one of the three produced audio/video signals and outputting the selected reproduced audio/video signal to an output terminal 23.

In operation, the three different audio/video signals A, B, and C are time divided by their respective input signal processors 15A, 15B, and 15C into field components. Simultaneously, three of the first control signals $\alpha1$, $\beta1$, and $\gamma1$ are produced for specifying their respective field components A1, B1, and C1 of the audio/video signals.

The three field components A1, B1, and C1 are transmitted to the recording signal processor 17 while the three first control signals $\alpha1$, $\beta1$, and $\gamma1$ are fed to the recording sync signal processor 16. In response, the second control signal $\alpha$ is sent from the recording sync signal processor 16 to the recording signal processor 17 for determining a desired order of the three field components A1, B1, and C1.

The recording synch signal processor 16 also produces the third control signal $\beta$ which identifies the field components A1, B1, or C1 and allocates the third control signal $\beta$ to a pertinent recording track of a magnetic recording tape for storage.

Then, the recording signal processor 17 transmits the field components A1, B1, and C1 to the recorder unit 18 in the order determined by the second control signal $\alpha$. In the recorder unit 18, the three field components A1, B1, and C1, for example, are recorded in this order into three adjacent recording tracks 26A, 26B, and 26C of the magnetic recording tape 24 as shown in FIG. 9(b). Simultaneously, the third control signal $\beta$ is stored in a control track 25 for use in the playback operation.

During reproduction, the field components A1, B1, and C1 of the reproduced audio/video signals are sent in the same order from the recorder unit 18 to the reproduced signal processor 19. Concurrently, the third control signal $\beta$ is retrieved and fed to the reproducing sync signal processor 21. In response to the third control signal $\beta$, the reproducing sync signal processor 21 produces the fourth control signal $\Delta$ to identify the combination of the three field components A1, B1, and C1 in synchronism. The fourth control signal $\Delta$ then causes, the reproduced signal processor 19 to distribute the field components A1, B1, and C1 to their respective channels coupled to the output signal processors 20a, 20B, and 20C respectively. As the three channels are turned on by the switch 22, a desired audio/video signal of the reproduction will be obtained.

However, the recording/reproducing apparatus performs a decimation of data in both the audio and video components of the signal at an equal rate, thus causing dropoffs in the reproduced sounds. Additionally, its circuitry arrangement is relatively bulky in size and will most likely cost higher. When a single program has been recorded by the multi-program recording/reproducing apparatus, it is difficult to reproduce the signal in the same quality as of other single program recording/reproducing apparatuses.

SUMMARY OF THE INVENTION

The present invention provides an improved recording/reproducing method and a corresponding apparatus for recording and reproducing a plurality of different television signals. The televisions include video components and audio components.

The recording/reproducing apparatus's circuitry is minimized, therefore, reducing the cost of reproducing the apparatus.

In playback mode, the recorded information to be reproduced is automatically examined to determine if it contains a single program or multiple program data so that unwanted deterioration can be avoided in the playback quality of the single program data.

The recording/reproducing method of the present invention comprises the steps of selecting and delivering the video components of input television signals. Then a control signal is extracted from each of the selected video component signals and examined to determine whether the selected video signal is to be recorded or played back. The selected video signal is recorded in a specific pattern on the applicable recording tracks of a recording medium as defined by the control signal. The above steps are performed for recording the video components of the input television signals.

Reproduction of the video signals stored on the recording medium is initiated by selectively retrieving the video signal from the recording tracks of the recording medium in accordance with its control signal. The reproduced video signals are examined to extract their control signals and to enable play back according to their respective control signals. The above steps are completed for reconstruction of the video components of the input television signals.

When the input television signals are being recorded, the audio or stereo components of the input television signals are separated. The right sounds of the stereo components are data compressed and multiplexed and the left sounds are data compressed and multiplexed. Then, the left and right data compressed and multiplexed signals are recorded onto the stereo or left/right sound tracks of the recording medium respectively.

The audio signals are reproduced by the selective retrieval of audio data from the audio sound tracks of the recording medium in accordance with its control signal.

The method of recording and reproducing multiple television signals in accordance with the present invention consists of processing video and audio components separately in both the recording and playback modes. Accordingly, when a plurality of different television signals are provided, both the video and audio components of each television signal can be recorded. Reproduction of a desired television signal can be ensured by reconstructing its video and audio components separately. One advantage of the present invention is that the audio signal is data compressed prior to recording and also, that a control signal is used, e.g. a sync signal and/or an extra signal attributed to the original television signal for use in both the recording and playback modes.

When the data input contains two different television signals, the steps of recording and reproducing the audio components are executed separately. Specifically, recording is implemented by receiving two audio stereo signals corresponding to the respective television signals. Then recording one channel of one of the two signals, the first audio signal, onto either the right or left sound track of the recording medium while one channel of the other, the second audio stereo signal, is recorded onto another sound track. The second audio signal is not recorded on the same channel as the first audio sound signal. In playback, the audio stereo sound signals are reproduced from the audio sound tracks of the recording medium using the control signal of the video signal.

Accordingly, two audio stereo components can be recorded in monaural mode.

A recording/reproducing apparatus of the present invention employing the foregoing method of recording and reproducing multiple television signals includes a video signal input section for receiving video components of the television signals and selectively delivering the video components. A video signal examining section for receiving the video output of the video signal input section, extracting a control signal from each video component, and determining whether the video signal is to be recorded or played back. A recording control section is provided for selecting a specific pattern of applicable recording tracks of a recording medium in response to the control signal and recording the video signals, which are to be recorded in accordance with its control signal, onto the designated recording tracks. A playback control section is provided for reproducing the video signal from the recording tracks of the recording medium in a sequence defined by the control signal. An audio signal recording/reproducing section receives the stereo audio signals which match their respective video signals. The right sounds of the stereo audio signals are data compressed and multiplexed, and the left sounds of the stereo audio signals are data compressed and multiplexed. Both the right and left data compressed and multiplexed audio signals are recorded onto corresponding right and left stereo sound tracks of the recording medium. The audio signal recording/reproducing section also selectively reproduces desired signals from the stereo sound tracks of the recording medium in accordance with the control signal of the television signal to be played back. The output of the playback control section is coupled to the input of the video signal input section.

Accordingly, the video and audio components of the multiple television signals can be recorded and reproduced. Both the video signal to be recorded and the reproduced video signal are fed and processed in the video signal input section. Any playback signal as well as any input signal are examined to detect a control signal of the video input. Hence, the selection between recording and reproducing and other signal processing is determined by analyzing the control signal in the same circuit. This arrangement minimizes the size of the apparatus.

In addition, the recording control section is adapted to display on a display at least one of the multiple video signals to be recorded and also, to selectively indicate on the display at least one of the playback video signals reproduced by the playback control section. This allows another circuit to be developed for recording and reproducing.

Furthermore, the playback control section has a playback mode control terminal for feeding an external control signal so that recorded data can be reproduced directly from the recording tracks of the recording medium. When the recorded data is a single program television signal, it can be reproduced directly from the recording tracks without performing any sampling action. As a result, deterioration in the playback quality of the single program television signal may be minimized. The multi-program television signal consists of even or odd fields as is constructed by a given sampling technique. Therefore, a single program television signal can easily be identified by detecting its signal format of alternate even and odd fields. As the single program television signal is identified, it is directly reproduced from the recording medium without sampling. This will help prevent undesired quality deterioration in the playback.

BRIEF DESCRIPTION OF THE DRAWINGS

FIGS. 1(c) and 1(d) are flow charts of steps of another recording and reproducing method showing a fourth embodiment of the present invention;

DETAILED DESCRIPTION OF THE INVENTION

First Exemplary Embodiment

Figure 1A:
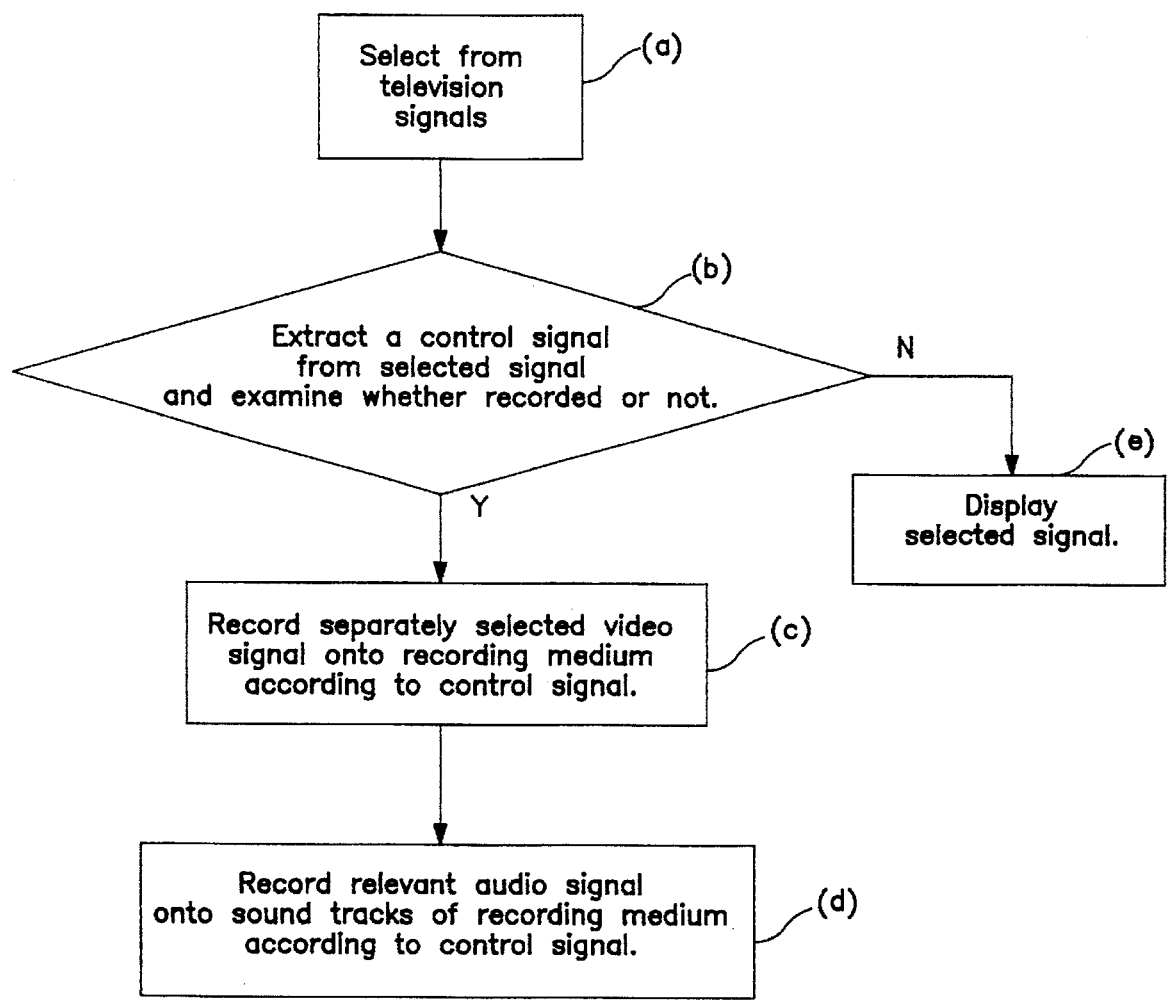
FIGS. 1(a) and 1(b) are flow charts of steps of a recording and reproducing method showing a first embodiment of the present invention.
Figure 1B:
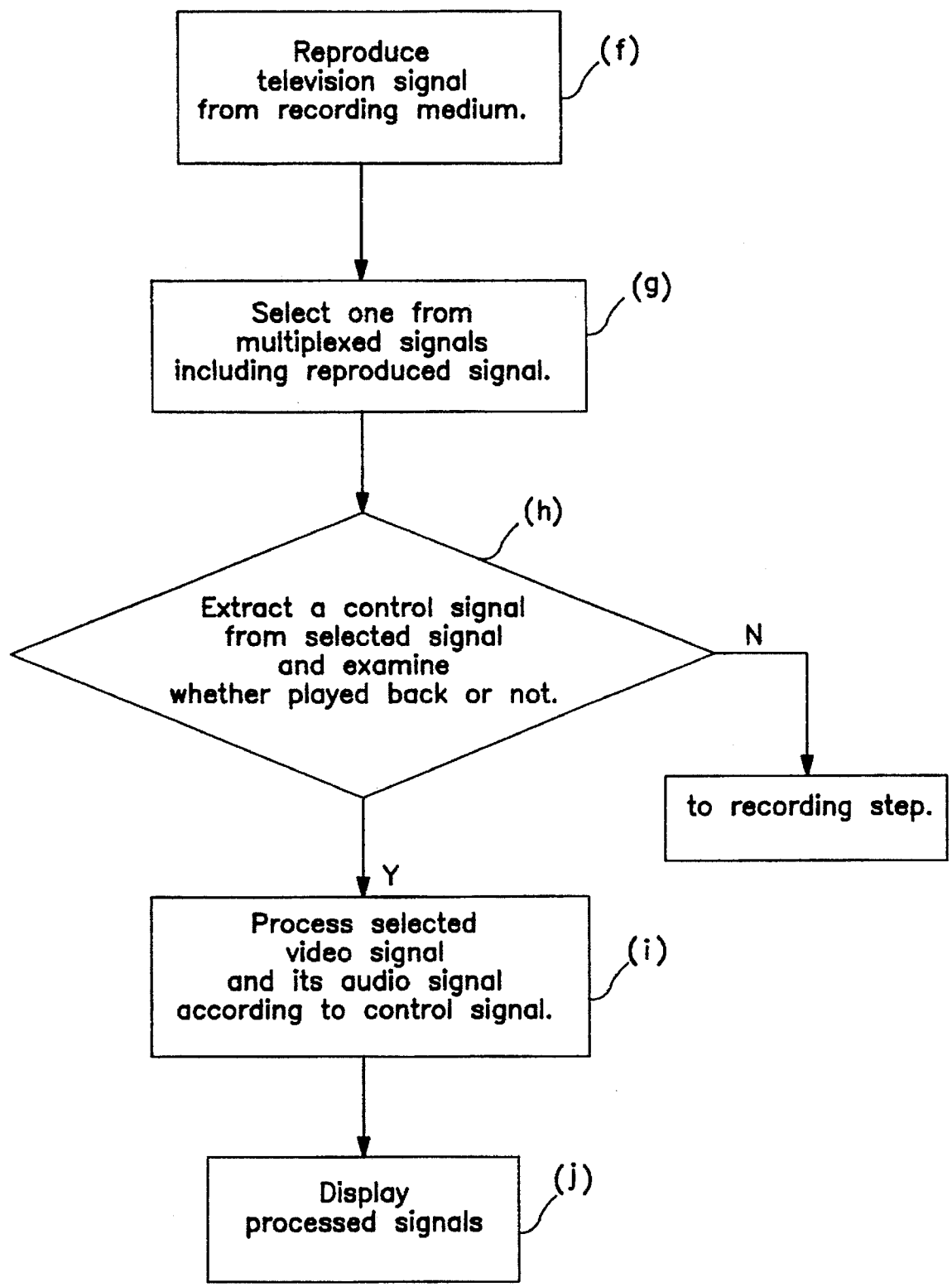

A multiple television signal recording/reproducing method according to the first exemplary embodiment of the present invention and its apparatus will be described referring to the accompanying drawings. FIGS. 1(a) and 1(b) illustrate using flow charts the recording and reproducing method.

As shown in FIG. 1(a), a plurality of television signals of different formats, e.g. BS or CS signals, are received and then examined in Step (a) so that a television signal can be selected to meet the purpose. One selected television signal is transferred to Step (b) where a control signal from the television signal is detected, extracted, and examined. At step (b) it is determined whether the control signal is a sync signal attributed to the television signal or an extra data signal indicating the television signal character, e.g., a playback signal or a recording signal (in this exemplary embodiment, the control signal is examined to determine whether it is to be recorded or not).

When the selected television signal has been identified as a television signal to be recorded at Step (b), its video and audio components are separated. The video components are allocated by the control signal to corresponding recording tracks of a recording medium for separate storage at Step (c). At Step (d), the audio components are extracted, data compressed, multiplexed, and recorded in accordance with the control signal onto the audio sound tracks of the recording medium. Steps (c) and (d) are performed substantially at the same time. Step (d) can occur prior to step (c). If the selected television signal is found to be a signal which is not to be recorded at Step (b), it will simply be played back on a display at step (e).

The television signals recorded in the recording medium by the foregoing method are reproduced by retrieving the television signals directly from the recording medium at Step (f) as shown in FIG. 1(b). The reproduced television signals are then transferred to Step (g) where they and other input television signals are examined for selection. The selected television signal is examined at Step (h) to determine whether it is to be played back or recorded. If it is determined that the selected television signal is to be played back, the selected television signal is processed at Step (i) by reversing the recording method as defined by the control signal. Specifically, the selected television signal's video components are reconstructed by combining the video signal data, while selected television signal's audio components are demultiplexed and data expanded. Combining of the video signals is the inverse of the signal data separation. The reproduced television signal is then displayed at Step (j). Accordingly, multiple television signals can be retrieved from the recording medium and played back as desired. If the selected television signal is determined to be another input television signal at step (h), the procedure moves to the recording procedure shown in FIG. 1(a).

Second Exemplary Embodiment

Figure 2A:
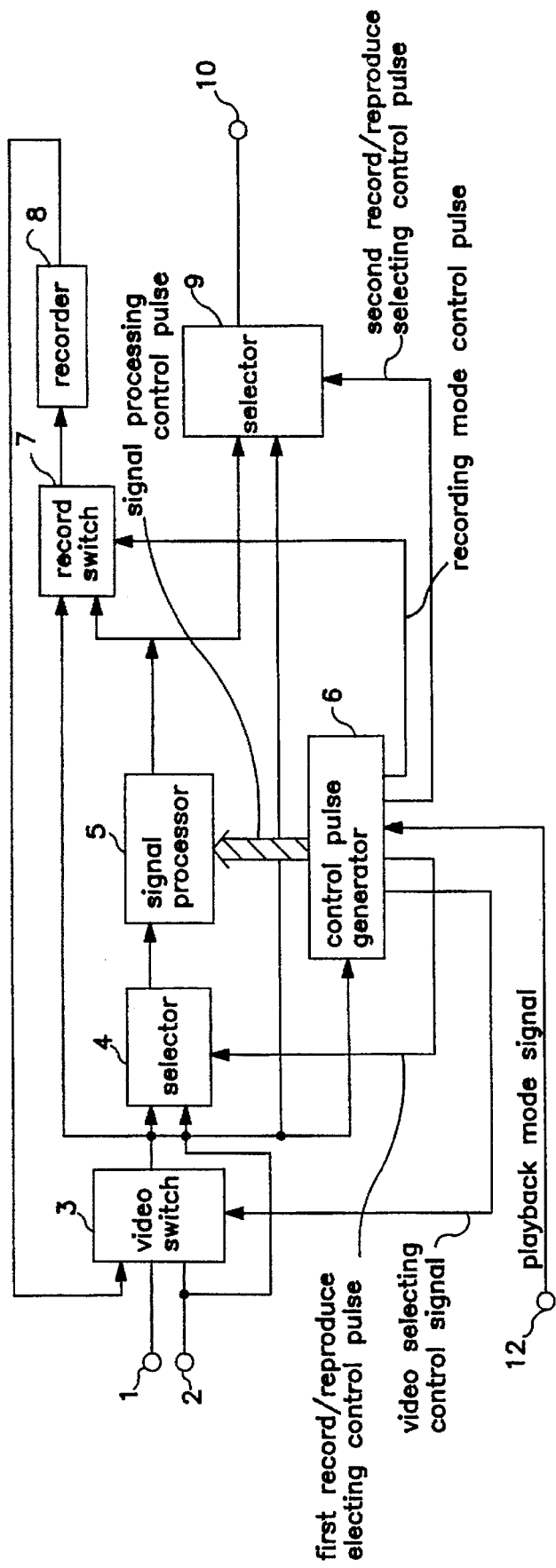
FIG. 2(a) is a block diagram of a video signal recording/reproducing apparatus showing a second embodiment of the present invention.

FIG. 2 is a block diagram of a second exemplary embodiment of the recording/reproducing apparatus for recording and reproducing video components of an input television signal.

Video signal input terminals 1 and 2 are provided for receiving the video components of input television signals. A video selector switch 3 is provided for selecting the input video signals to pass. A control pulse generator 6 is provided for detecting a control signal from the selected video signal and for producing a control pulse signal according to the control signal. The recording/reproducing selector switches 4 and 9 switch the input in response to the control pulse signal of the control pulse generator 6. The control pulse signal indicates whether the selected video signal is to be recorded or simply played back. The signal processor 5 is provided for processing the selected video signal output of the recording/reproducing selector switch 4 according to the control pulse signal from the control pulse generator 6.

A recording switch 7 transmits the video signal processed by the signal processor 5 and its corresponding control pulse signal from the control pulse generator 6 to a recorder unit 8 which records the video signal from the recording switch 7 in response to its control signal.

A playback mode input terminal 12 is provided for selectively controlling the playback mode to reproduce the video signal stored in the recorder unit 8. Video signal output terminal 10 outputs the video signal released by the recording/reproducing selector switch 9 for playback.

The operation of the recording/reproducing apparatus of the second embodiment is explained below using two video signals for simplicity.

The two video signals A and B are received at input terminals 1 and 2, respectively. The video signals are transmitted to the video signal selector switch 3 where, for example, video signal A is selected for recording in response to the control or selecting pulse signal from the control pulse generator 6. The two video signal input terminals 1 and 2 and the video signal selector switch 3 are the video signal input section. In response to the control or recording/reproducing selecting pulse signal from the control pulse generator 6, the recording/reproducing selector switch 4 selects video signal B, for example, to be combined with video signal A for recording. The recording/reproducing selector switch 4 and the control pulse generator 6 are the video signal examining section. The video signal B delivered from the recording/reproducing selector switch 4 is fed to the signal processor 5 where it is synchronized in field or frame with the video signal A according to the signal processing control pulse signal from the control pulse generator 6. The field or frame synchronization may be implemented using field or frame memories. The synchronized video signals A and B are transmitted to the recording switch 7 where they are combined together by the recording mode control pulse signal from the control pulse generator 6. The combined video signal is then delivered to the recorder unit 8. The signal processor 5, the recording switch 7, and the recorder unit 8 constitute a recording control section.

Figure 7A:
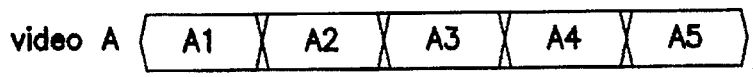
FIG. 7(a)–7(b) are explanatory view showing format patterns of the multiple video signals.
Figure 7A:
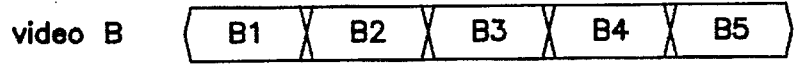
Figure 7A:
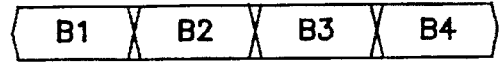
Figure 7A:
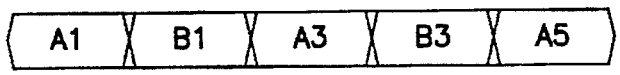

This sequence of actions is described below in more detail with reference to the format patterns of the signals. As shown in FIG. 7(a), the video signal A consists of a series of fields A1, A2, . . . while the video signal B consists of B1, B2, . . . As the two signals are fed to the video signal input terminals 1 and 2, video signal A is selected by video signal selector switch 3 because it is regarded as a reference signal for the synchronizing operation. The video signal B is selected by the recording/reproducing selector switch 4 and fed to the signal processor 5. As shown in FIG. 7(a), the output of the signal processor 5 is the video signal B synchronized in field with the video signal A. Then in the recording switch 7, as shown in FIG. 7(a), the video signal A and the synchronized video signal B are combined by sampling the fields of the two signals alternatively. The resulting sampled signal from the recording switch 7 is then recorded by the recorded unit 8.

The recording/reproducing selector switch 9 allows the video signal A to pass to the video signal output terminal 10 according to the recording/reproducing control pulse signal from the control pulse generator 6. Hence, the video signal A can be played back on a display while the combined signal is being recorded. When one program is to be recorded, the control pulse generator 6 sends a recording mode control pulse signal to the recording switch 7. This allows the video signal A to pass through recording switch 7 without sampling. Therefore video signal A can be recorded in the same manner as a traditional one-program recorder.

To retrieve a signal, the video signal selector switch 3 receives a playback mode control pulse signal from the control pulse generator 6. This selects the output signal of the recorder unit 8 for playback. The input video signals from the video signal input terminals 1 and 2 are rejected when the recorder unit 8 is in playback mode. The output signal of the recorder unit 8 is then fed to the recording/reproducing selector switch 4 where it is determined whether the signal is to be played back in accordance with the recording/reproducing switching control pulse signal from the control pulse generator 6. The signal output of the recorder unit 8 is then passed through the circuit which contains the video input section and the video signal processing section. This circuit was used to record the video signal initially. The signal output of the recorder unit 8 is processed by the signal processor 5 which can serve as a playback control unit. The signal processor 5 is triggered by a signal processing control pulse signal from the control pulse generator 6 to perform an inversion of the signal combining action implemented by the recording switch 7. As a result, either of the video signals A and B can be reproduced for playback.

Figure 7B:
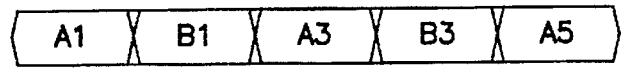
Figure 7B:
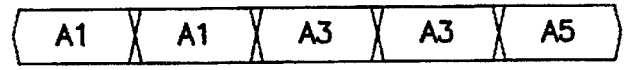
Figure 7B:
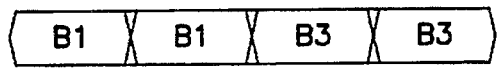

Playback of the recorded signals is described with reference to the format patterns of the signals. As shown in FIG. 7(b), the multi-program signal recorded by the recorder unit 8 is directly reproduced. The output signal released from the recorder unit 8 is processed by the signal processor 5 using field or frame memories to reconstruct the video signal A or B. For ease of the description, FIG. 7(b) shows a reproduced signal, for example, where the dropout in the signal is compensated with the previous field or frame data. It is understood that the compensation of data may be carried out by field or frame interpolation with equal success.

The control pulse generator 6 also produces a second recording/reproducing switching control pulse signal in response to a playback mode signal fed through the playback mode input terminal 12. In response to the second recording/ reproducing switching control pulse signal from the control pulse generator 6, the recording/reproducing selector switch 9 determines if the reproduced video signal is from a single program or from a multi-program video signal which contains two-program data. The recording/reproducing selector also transmits the reproduced video signal to the video signal output terminal 10 for playback. The determination of whether the reproduced video signal is a single program video signal or a two-program multiple video signal is performed to avoid the sampling action which is essential for reproduction of the multi-program video signal but which causes a quality deterioration in the playback of the single program video signal.

Third Exemplary Embodiment

Figure 3A:
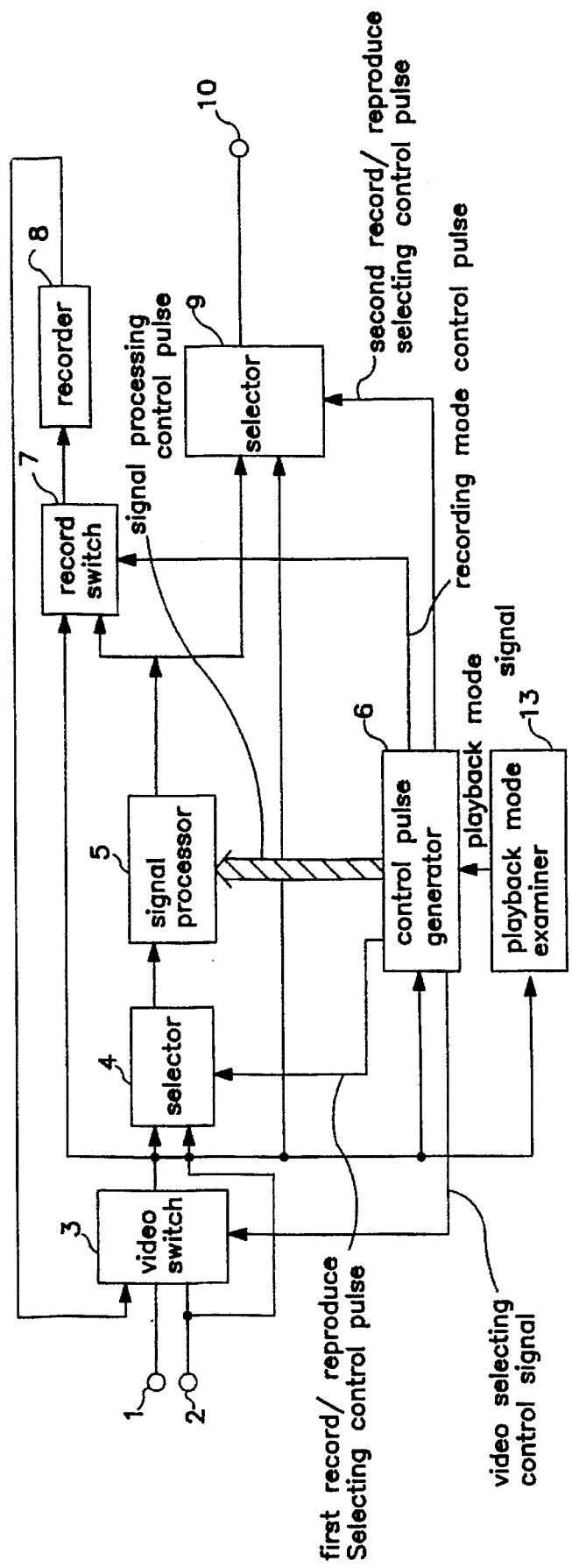
FIG. 3(a) is a block diagram of a further video signal recording/reproducing apparatus showing a third embodiment of the present invention.

FIG. 3 is a block diagram of a third exemplary embodiment of the recording/reproducing apparatus for recording and reproducing video signals.

The apparatus includes two video signal input terminals 1 and 2, a video signal selector switch 3, two recording/ reproducing selector switches 4 and 9, a signal processor 5, a control pulse generator 6, a recording switch 7, a recorder unit 8, and a video signal output terminal 10. These components are similar to the components of the second embodiment. The third embodiment is distinguished from the second embodiment by the application of a playback mode examining unit 13.

The operation of the recording/reproducing apparatus of the third exemplary embodiment is explained below. When two video signals A and B have been received through their respective video signal input terminals 1 and 2, the video signal selector switch 3 selects the video signal A, for example, according to a video signal selecting control pulse signal from the control pulse generator 6. The recording/ reproducing selector switch 4 selects the other video signal B according to a recording/reproducing switching control pulse signal from the control pulse generator 6. Then, the video signal B is fed to the signal processor 5 where it is synchronized with the video signal A by a signal processing control pulse signal from the control pulse generator 6. The field synchronization is implemented using field memories. The recording switch 7 then combines the synchronized video signals A and B, in response to a recording mode control pulse signal from the control pulse generator 6. The multi-program signal is then delivered to the recorder unit 8.

The above series of steps are identical to the steps of the second embodiment. The output signal of the recording switch 7 which is recorded by the recorder unit 8 is shown in FIG. 7(a). The output signal of the recording switch 7 consists of either even or odd fields.

The recording/reproducing selector switch 9 selects the video signal A according to a recording/reproducing switching control pulse signal from the control pulse generator 6. While in the recording mode, the recording/reproducing selector switch 9 transmits video signal A through to the video signal output terminal 10 for playback on a display. During the recording of a single program video signal, the video signal A can directly be transferred through the recording switch 7 in accordance with a corresponding recording mode control pulse from the control pulse generator 6.

When the video signal is reproduced, the video signal selector switch 3 selects the output signal of the recorder unit 8 in response to a video signal selecting pulse signal from the control pulse generator 6. The output signal of the recorder unit 8 is also selected by the recording/reproducing selector switch 4 in response to a recording/reproducing switching control pulse signal from the control pulse generator 6. The output signal of the recording unit 8 is then fed to the signal processor 5 where either the video signal A or B is extracted and reconstructed by a signal processing control pulse signal from the control pulse generator 6. The reconstruction of the video signal A or B is similar to that of the second embodiment as shown in FIG. 7(b), in which data from the field memories is utilized for compensation. FIG. 7(b) shows the compensation of data dropouts using the previous field data for ease of explanation. Field interpolation may also be used with equal success for maintaining the image quality.

The playback mode examining unit 13 of the third embodiment examines the order of even and odd fields in the output signal of the video signal selector switch 3. This process is performed on the multi-program video signal which may consist of either even or odd fields which have been sampled. The video signal of one program consists of alternate odd and even fields while the multi-program video signal is composed of a series of either even or odd fields. The even or odd fields are present only if two program signals have been combined to produce a multi-program video signal for recording. A playback mode signal determined by the playback mode examining unit 13 is supplied to the control pulse generator 6 which in turn generates a corresponding second recording/reproducing switching control pulse signal. In response to the second recording/reproducing switching control pulse signal from the control pulse generator 6, the recording/reproducing selector switch 9 determines whether one or two-program video signals are present. Recording/reproducing selector switch 9 passes the video signal to the video signal output terminal 10. A video signal composed of even or odd fields which is substantially similar to the existing nonstandard signal can be played back by a conventional VTR without difficulty.

Fourth Exemplary Embodiment

Figure 2B:
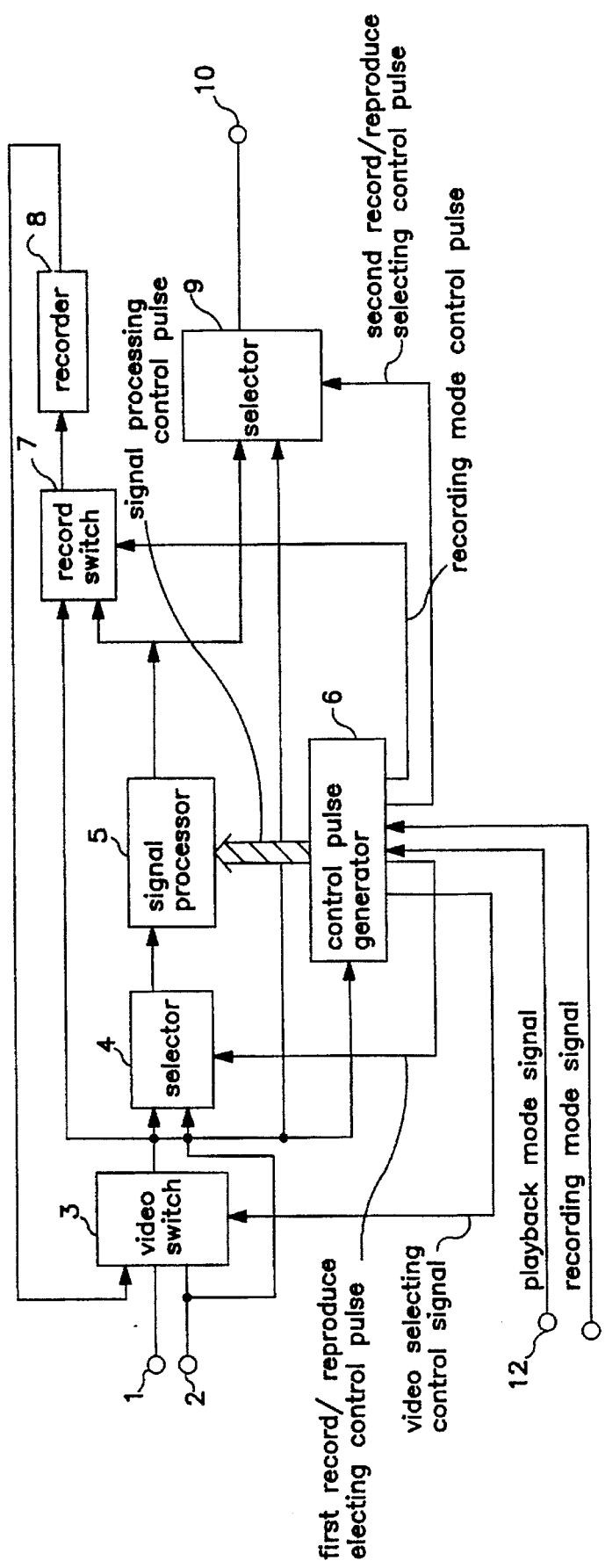
FIG. 2(b) is a block diagram of another video signal recording/reproducing apparatus according to the fourth embodiment.

FIG. 2(b) is a block diagram of a recording/reproducing apparatus for recording and reproducing video signals showing a fourth embodiment of the present invention. The fourth embodiment is differed from the second embodiment by the fact that the video selector switch 3 is connected to an external input terminal for receiving an external video selecting control pulse signal similar to the video selecting control pulse from the control pulse generator 6 and also, the control pulse generator 6 is connected to an external input terminal for receiving a recording mode signal. The other arrangement is identical to that of the second embodiment.

In common, the recording mode is determined by a video signal to be recorded. For multiplex recording of two different video signals for example, the recording mode is selected so that the two signals are recorded alternately in fields or frames. For the purpose, the control pulse generator 6 systematically produces the signal processing control pulse containing a recording mode data as described in the second embodiment.

In addition, if the supply of such a control pulse signal is enabled through the external input terminal, it can determine which video signal is selected at the video selector switch 3 and which mode is used for recording the selected video signal. Upon receiving the video signal selecting pulse signal fed through the external input terminal, the video selector switch 3 selects a corresponding video signal to pass. Simultaneously, the video signal selecting pulse signal and a relevant recording mode signal are fed to the control pulse generator 6 which in turn produces a corresponding signal processing control pulse. The selected video signal is then processed by the signal processor 5 according to the signal processing control pulse and fed to the recorder 8 for recording.

Figure 1C:
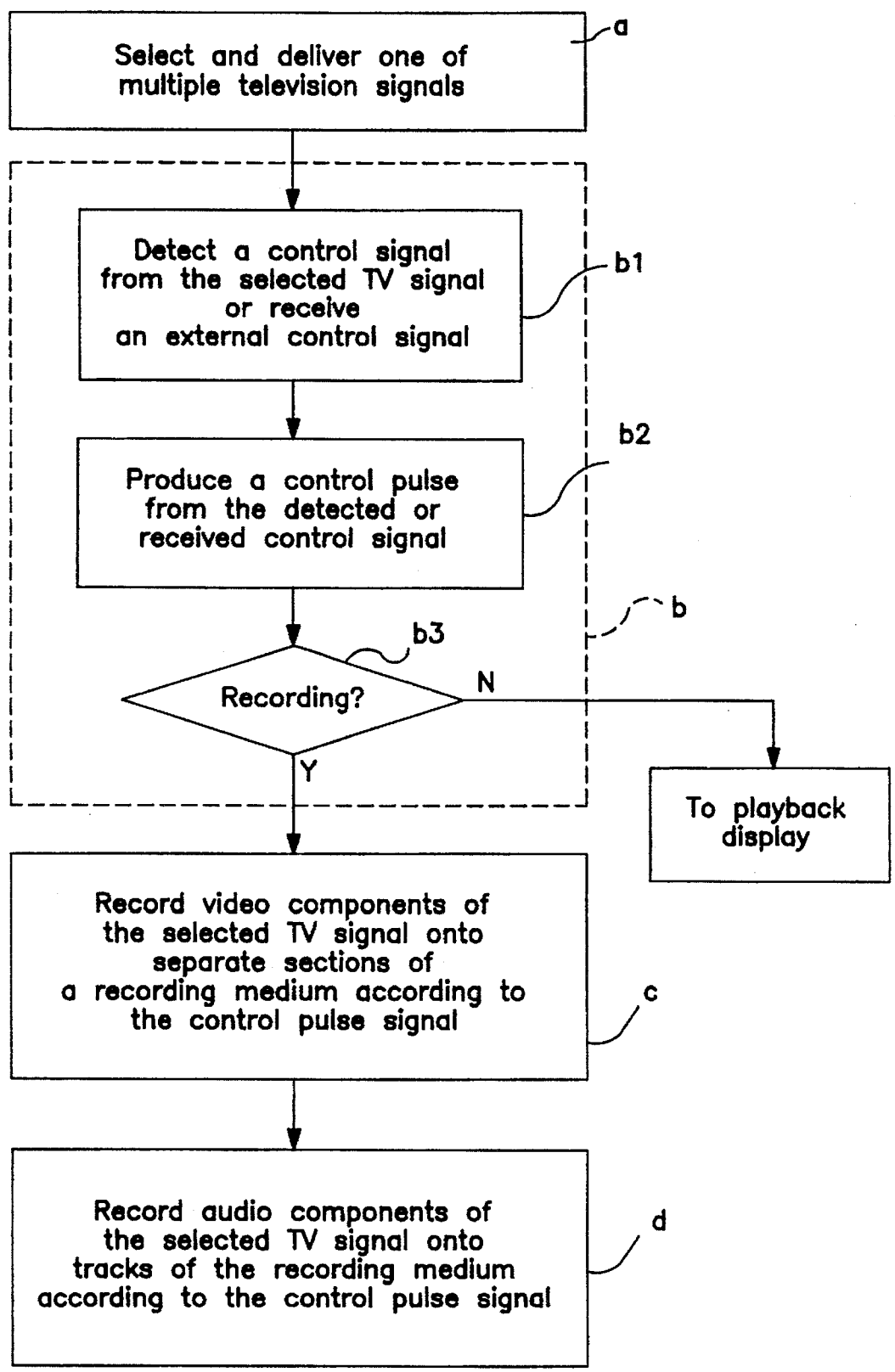

This series of actions will be explained referring to the flow chart of FIG. 1(c). As shown, Step b of the first embodiment is divided into three sub steps: Step b1 where a control signal is detected or infed through the external input terminal, Step b2 where in response to the control signal detected or infed, the control pulse generator 6 produces a control pulse signal, and Step b3 where it is determined from the control pulse signal whether the recording or playback operation is executed. For processing a reproduced television signal, Step h of the first embodiment is divided into three sub steps, as shown in FIG. 1(d): Step h1 where a control signal is detected or infed through the external input terminal, Step h2 where in response to the control signal detected or infed, the control pulse generator 6 produces a control pulse signal, and Step h3 where it is determined from the control pulse signal whether the playback or recording operation is executed.

Accordingly, the control on the recorder 8 can favorably be adjusted depending on the types of recording mediums. Also, a desired recording method optimum to the purpose can be used thus increasing the efficiency of its operation.

Figure 3B:
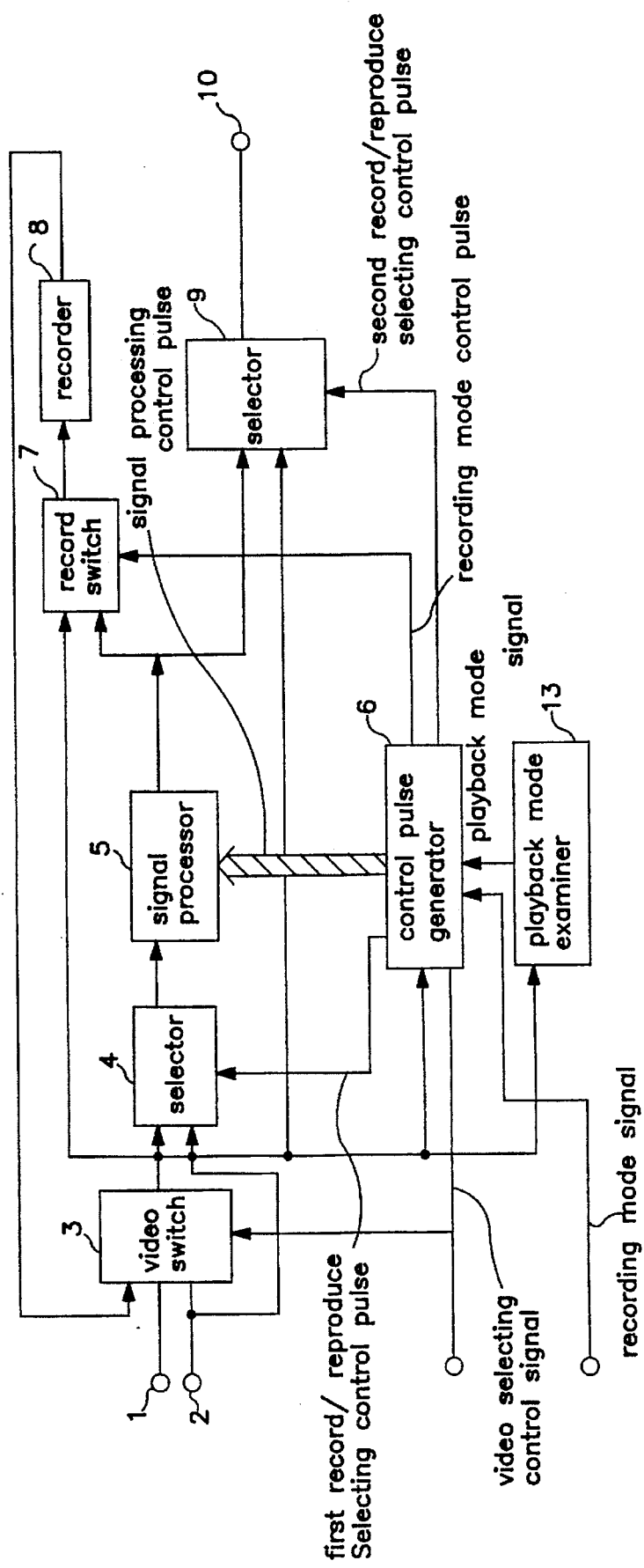
FIG. 3(b) is a block diagram of the video signal recording/reproducing apparatus of the fourth embodiment.

Similarly, a modification of the video signal recording/reproducing apparatus of the third embodiment is shown in the block diagram of FIG. 3(b). It is differed from the third embodiment by the fact that the video selector switch 3 is connected to an external input terminal for receiving an external video selecting control pulse signal similar to the video selecting control pulse from the control pulse generator 6 and also, the control pulse generator 6 is connected to an external input terminal for receiving a recording mode signal. The other arrangement is identical to that of the third embodiment. Accordingly, both the selection of a video signal and the recording mode setting can be controlled from the outside. More particularly, a desired recording mode appropriate to the type of a recording medium or specified for the purpose can be determined.

Fifth Embodiment

Figure 4:
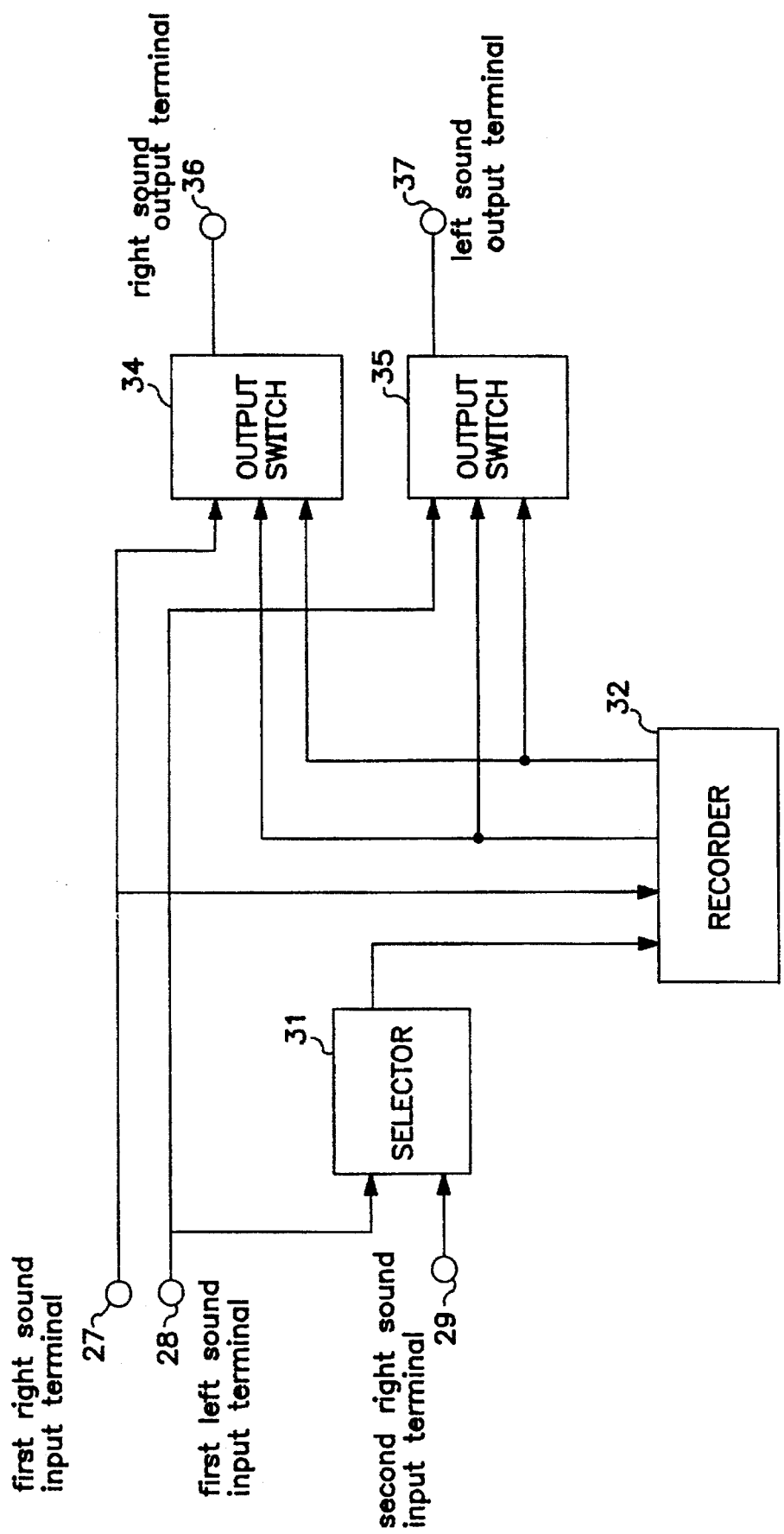
FIG. 4 is a block diagram of an audio signal recording/reproducing apparatus showing a fifth embodiment of the present invention.

FIG. 4 is a block diagram of a further recording/reproducing apparatus for recording and reproducing audio signals showing a fifth embodiment of the present invention.

As shown, there are provided a first right sound input terminal 27, a first left sound input terminal 28, a second, right sound input terminal 29, a recording switch 31, a recorder unit 32, two output switches 34 and 35, a right sound output terminal 36, and a left sound output terminal 37.

The action of the apparatus of the fourth embodiment will be described with the application of two different television signals. In recording audio components of the two television signals, the right sound of an audio component of one or first television signal is fed through the first right sound input terminal 27 to the right sound input of the recorder unit 32. Simultaneously, the recording switch 31 upon detecting the feeding of the right sound of an audio component of the other or second television signal to the second right sound input terminal 29 transmits the right sound to the left sound input of the recorder unit 32. In other words, the right sounds of stereo audio components of the two television signals are recorded in monaural mode on audio sound tracks of the recording medium.

When one television signal is involved, its stereo audio components are fed the right sound through the first right sound input terminal 27 to the right sound input of the recorder unit 32 and the left sound through the first left sound input terminal 28 and the recording switch 31 to the left sound input of the same. More specifically, the stereo sounds of the single television signal are supplied at a time to the first right and left sound input terminals 27, 28 respectively and then, recorded in a stereo mode as compared with the monaural mode of the first and second right sounds resulting from the supply to the second right sound input terminal 29. The two sounds fed to the first right and left sound input terminals 27, 28 are also transmitted to their respective output switches 34 and 35 where they are admitted and allowed to run to the right and left sound output terminals 36 and 37 respectively for monitor use.

In playback, the two different sound data are released from the left and right sound outputs of the recorder unit 32 and fed to their respective output switches 35 and 34. The output switches 34 and 35 select corresponding audio components according to a control signal (not shown) detected during reproduction of the video signal and transmit them to the right 36 and left sound output terminals 37 for further delivery. In a single stereo sound mode, the two, left and right, sounds released from the left and right outputs of the recorder unit 32 are directly transmitted via their respective output switches 35 and 34 up to the left 36 and right sound output terminals 37.

Sixth Embodiment

Figure 5:
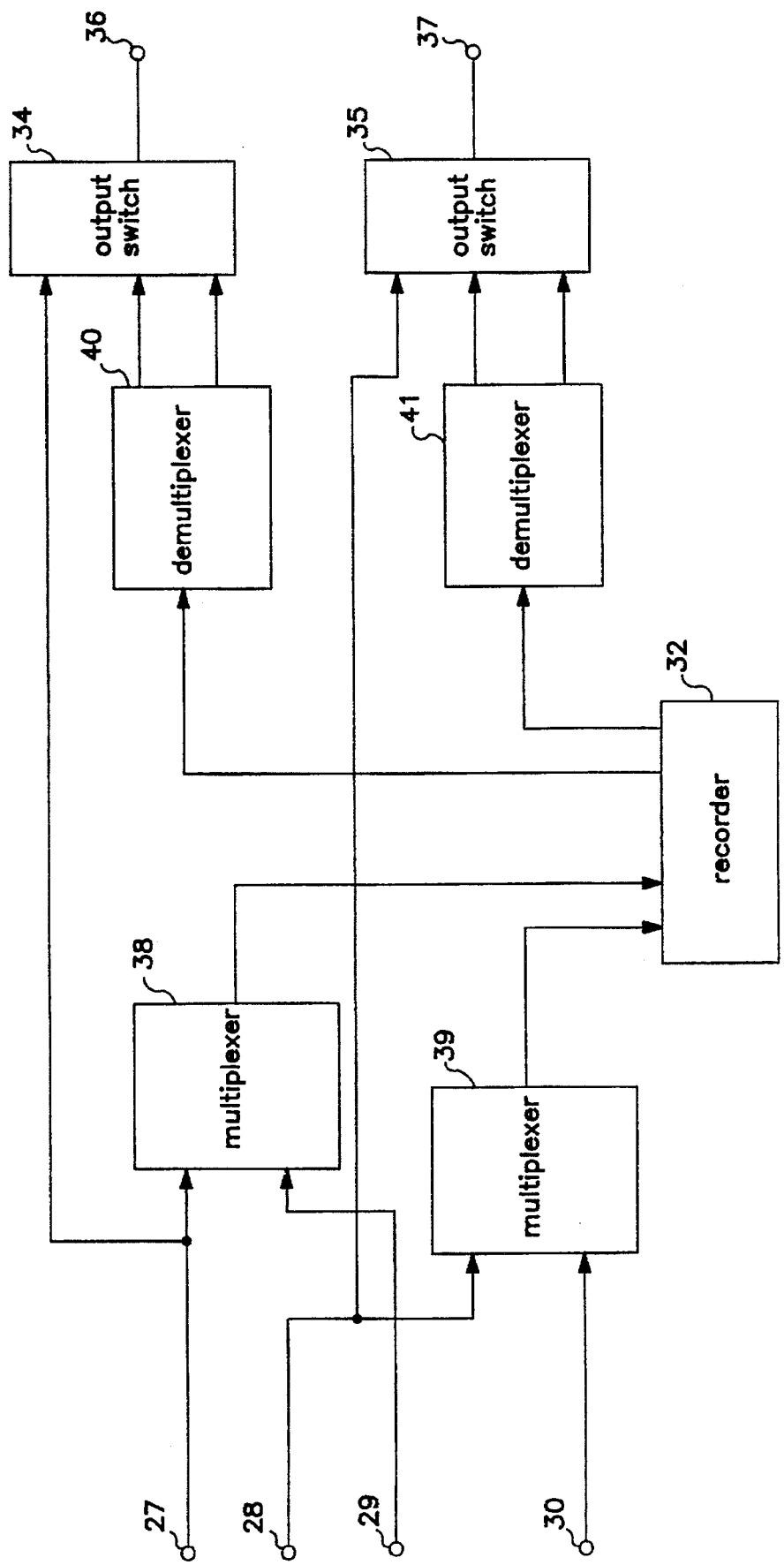
FIG. 5 is a block diagram of another audio signal recording/reproducing apparatus showing a sixth embodiment of the present invention.

FIG. 5 is a block diagram of a still further recording/reproducing apparatus for recording and reproducing audio signals showing a sixth embodiment of the present invention.

As shown, there are provided a first right sound input terminal 27, a first left sound input terminal 28, a second right sound input terminal 29, a second left sound input terminal 30, two multiplexers 38 and 39, a recorder unit 32, two demultiplexers 40 and 41, two output switches 34 and 35, a right sound output terminal 36, and a left sound output terminal 37.

The operation of the apparatus of the sixth exemplary embodiment is described below. When recording two audio signals, first and second audio signals, the right sounds of the first and second audio signals are fed through their respective right sound input terminals 27 and 29 to the multiplexer 38 where they are time multiplexed through data compression. The multiplexed signals are sent to the right sound input of the recorder unit 32 for storage in audio sound tracks of a recording medium. Similarly, the left sounds of the first and second audio signals are supplied through their respective left sound input terminals 28 and 30 to the multiplexer 39 where they are also time multiplexed through data compression. The multiplexed signals are sent to the left sound input of the recorder unit 32 for storage. Accordingly, the left and right channels of multiple stereo audio signals can simultaneously be recorded by multiplexing their data.

When a single stereo sound is to be recorded, its right sound is fed through the first right sound input terminal 27 to the right sound input of the recorder unit 32 without the multiplexing action of the multiplexer 38. Its left sound is supplied through the first left sound input terminal 28 to the left sound input of the recorder unit 32 without the multiplexing action of the multiplexer 39. This function may be implemented by determining if a signal is being fed to the second input terminals 29 and 30. If a signal is not detected, then the function of both the multiplexers 38 and 39 can be cancelled. This function may also be carried out using a control signal detected in the reproduction of the television signal.

During the recording operation, the right and left sounds of the first audio signal can also be fed through their respective audio sound input terminals 27 and 28 to the two output switches 34 and 35. The output switches 34 and 35 in turn pass the two sounds to the right and left sound output terminals 36 and 37, respectively, for monitor use.

When the different program sounds are reproduced, the multiplexed right sound signal is sent from the right sound output of the recorder unit 32 and input into the demultiplexer 40. The right sound output is demultiplexed by an inversion of the time compression to produce two right sounds which are then transmitted to the output switch 34. Similarly, the multiplexed left sound signal is sent from the left sound output of the recorder unit 32 and input into the other demultiplexer 41 where it is demultiplexed by an inversion of the time compression to produce two left sounds which are then transmitted to the output switch 35. The output switches 34 and 35 select the pair of the right and left sounds according to a control pulse signal extracted during the reproduction of the video component of the input signal. The selected right and left sounds which match the video signal are sent to their respective output terminals 36 and 37. When a stereo sound is played, its right and left sounds which have not been multiplexed are transferred from the right and left outputs of the recorder unit 32 to their respective output switches 34 and 35 directly without the need of demultiplexing at the demultiplexers 40 and 41. The right and left sounds are further delivered through the right and left sound output terminals 36 and 37 respectively.

Figure 6:
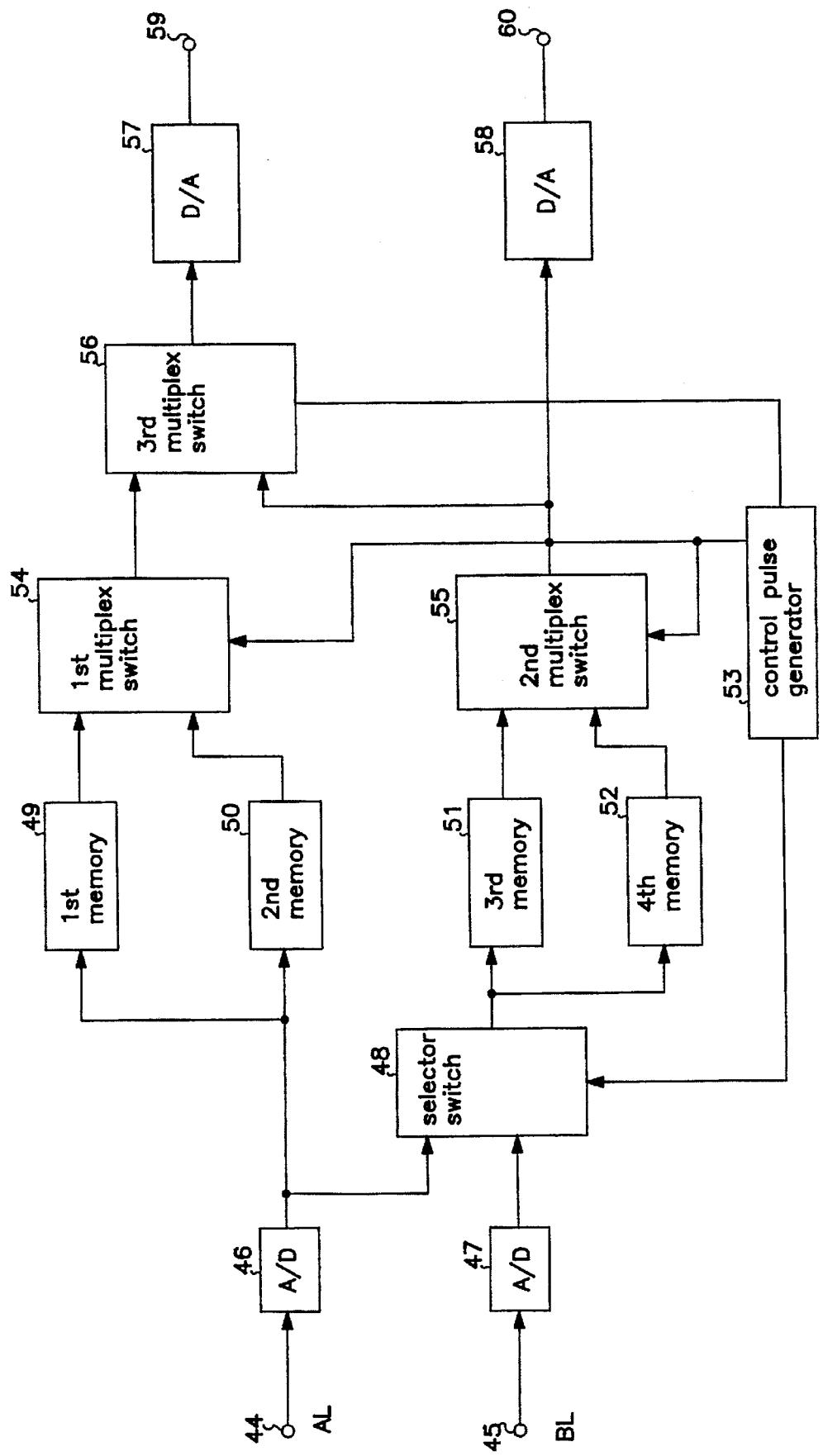
FIG. 6 is a block diagram of a multiplexing and recording section in the fifth embodiment.
Figure 8A:
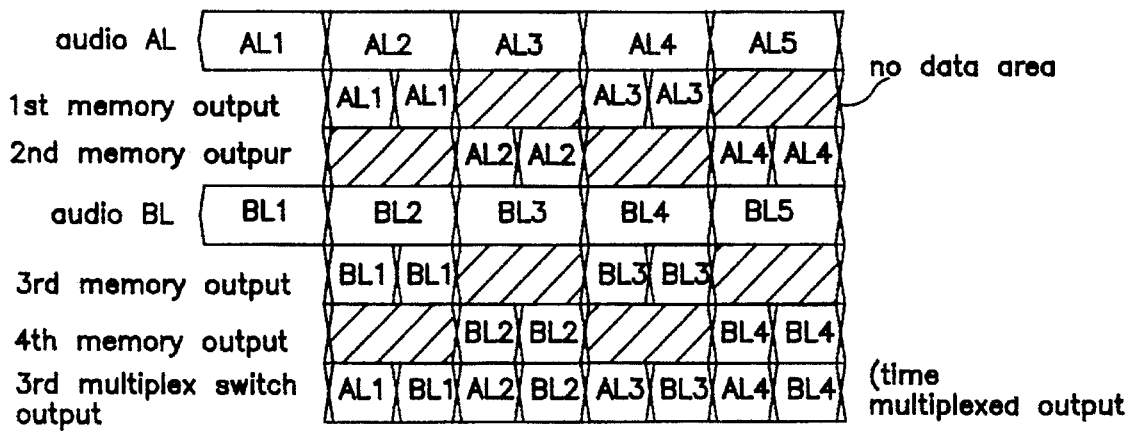
FIGS. 8(a)–8(b) explanatory view showing format patterns of the multiple audio signals.
Figure 8B:
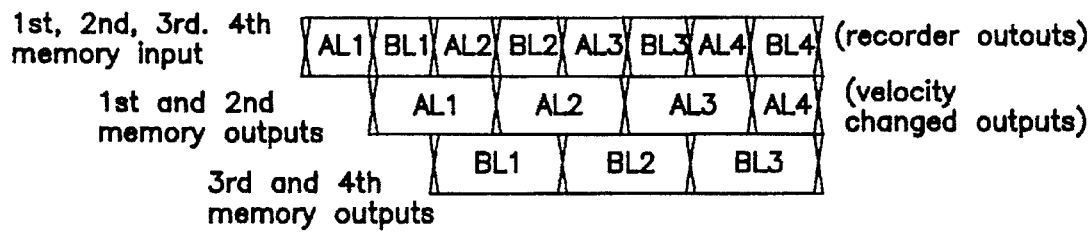
Figure 9A:
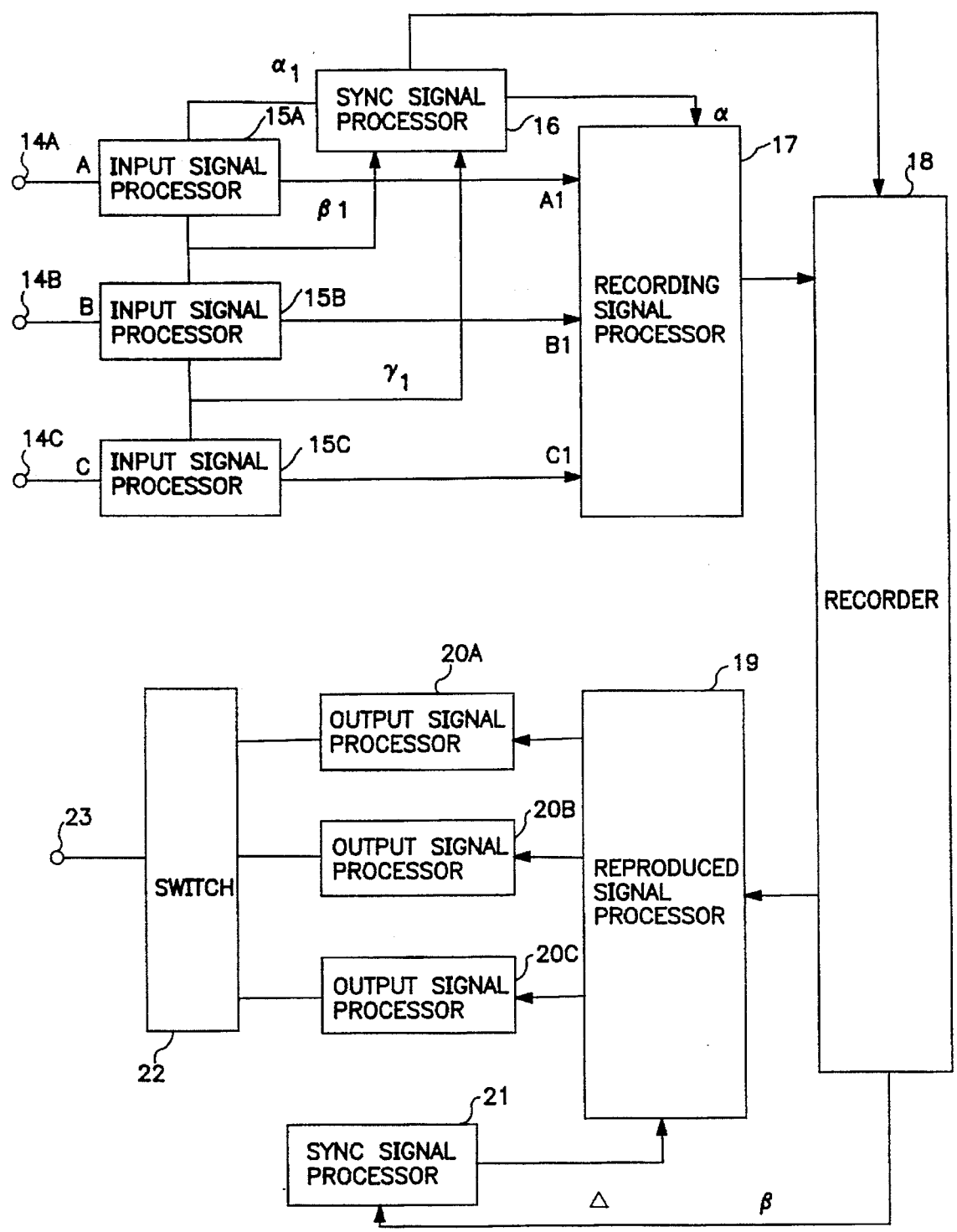
FIG. 9(a)–9(b) are block diagram of a prior art recording/reproducing apparatus.
Figure 9B:
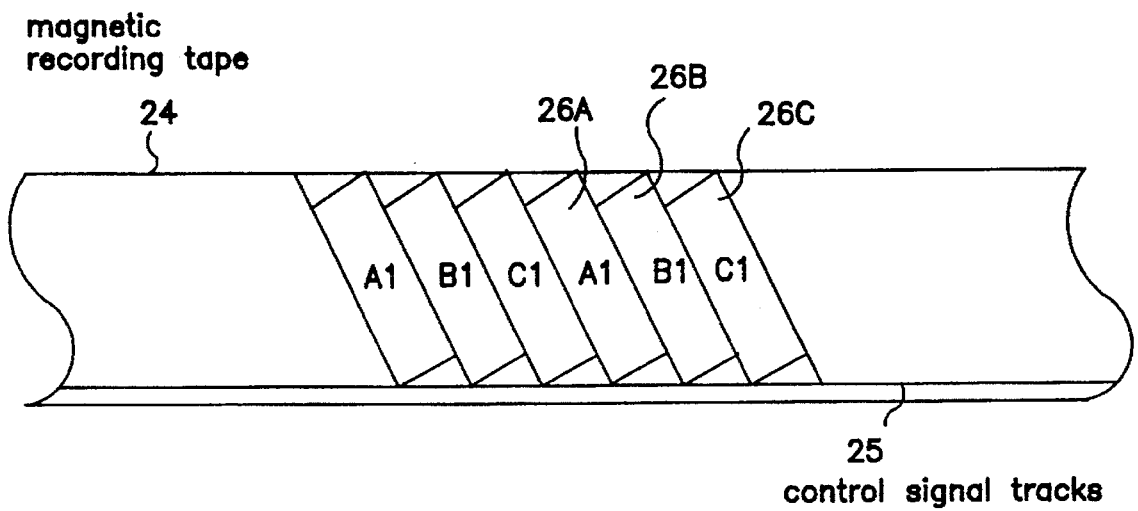

FIG. 6 shows a modification of the circuitry arrangement of the sixth exemplary embodiment which is substantially equivalent in function to the combination of the two multiplexers 38 and 39 and the two demultiplexers 40 and 41. The modified circuit can serve as both a multiplexer unit and a demultiplexer unit. As shown in FIG. 6, the circuit includes a first multiplex/demultiplex audio input terminal 44, a second multiplex/demultiplex audio input terminal 45, two A/D converters 46 and 47, a multiplex/demultiplex selector switch 48, four memories 49, 50, 51, and 52, three multiplexing switches 54, 55, and 56, a control pulse generator 53, two D/A converters 57 and 58, a first multiplex/demultiplex audio output terminal 59, and a second multiplex/demultiplex audio output terminal 60. The operation of the circuit of FIG. 6 will be explained below with reference to FIGS. 8(a) and 8(b).

A first audio signal AL and a second audio signal BL are input into their respective input terminals 44 and 45 and converted from analog to digital by the two A/D converters 46 and 47, respectively. The first audio signal AL is velocity converted by the two memories 49 and 50 as shown in FIG. 8. The multiplex/demultiplex switch 48 allows the second audio signal BL of digital form to move from the A/D converter 47 to the two memories 51 and 52 where it is also velocity converted in a similar manner. The two velocity converted audio signals A1 and BL are multiplexed by the combination of the multiplexing switches 54, 55, and 56. The resultant multiplexed signal is then converted from digital-to-analog by the D/A converter 57. The multiplexed signal is then transmitted through the first multiplex/demultiplex audio output terminal 59 to a recorder unit for recording.

During the demultiplexing process, a multiplexed audio signal is fed to the first multiplex/demultiplex audio input terminal 44 which distributes the signal to the four memories 49, 50, 51, and 52. The multiplex/demultiplex selector switch 48 allows the multiplexed audio signal to pass. Accordingly, its multiplexed components are velocity converted by the memories 49, 50, 51, and respectively, to reconstruct two audio signals AL and BL as shown in FIG. S. The audio signal AL is transmitted through the two multiplexing switches 54 and 56 to the D/A converter 57 while the other audio signal BL is sent through the multiplexing switch 55 to the D/A converter 58. The two audio signals A1 and BL in analog form are then output to their respective output terminals 59 and 60 for playback.

As set forth above, the multiple television signal recording/reproducing apparatus of the present invention allows the input television signal to be divided into two, video and audio, components which are then processed prior to recording and playing back. As a result, the signal can be recorded or played back without serious deterioration of audio quality. The audio component is recorded in a mono mode or a multiplex mode depending on its format. During playback, the mono signal will be reproduced without developing any audible dropout of sound.

In addition, the video signal is automatically examined to determine whether or not it is a single program signal or a multiplexed program signal. This determination is accomplished by reviewing the signals field polarity (i.e. detection of even and odd fields). During playback, the single program signal and the multiple program signal are systematically selected so that deterioration in the playback quality is minimized.

While the invention has been described in terms of the exemplary embodiments, it is contemplated that it may be practiced as outlined above with modifications within the spirit and scope of the appended claims.

What is claimed:

1. A recording/reproducing apparatus for recording input signals having left and right stereo sound signals, said apparatus comprising:

a first right sound signal input terminal and a first left sound signal input terminal for receiving a first stereo sound signal;

a second right sound signal input terminal for receiving a second stereo sound signal;

a recording switch connected to said first left sound signal input terminal and said second right sound signal input terminal for passing and outputting an input signal from said second right sound signal input terminal when two of said input signals are to be recorded and for passing and outputting an input signal from said first left sound signal input terminal when one of said first input signals is to be recorded;

recorder means connected to said output of said recording switch and to said first right sound signal input terminal for recording the stereo sound signals, said recorder means having a right sound signal output and a left sound signal output;

left sound signal output means connected to said first left sound signal input terminal and said output of said recorder means for passing and outputting an input signal from said first left sound signal input terminal in the recording mode and for passing and outputting an output signal of said recorder means in the playback mode;

right sound signal output means connected to said first right sound signal input terminal and said signal output of said recorder means for passing and outputting in the recording mode an input signal from said first right sound signal input terminal and in playback mode for passing an output signal of said signal output of said recorder means;

a left sound signal output terminal connected to said output of said left sound signal output means; and a right sound signal output terminal connected to said output of said right sound signal output means.

2. A recording/reproducing apparatus for recording input signals having left and right stereo sound signals, said apparatus comprising:

a first right sound signal input terminal and a first left sound signal input terminal for receiving a first stereo sound;

a second right sound signal input terminal and a second left sound signal input terminal for receiving a second stereo sound;

first audio signal multiplexer means connected to said first and second right sound signal input terminals for time compressing, multiplexing and outputting two output signals of said first and second right sound signal input terminals when two input signals are to be recorded and for passing and outputting an output signal of said first right sound signal input terminal when one input signal is to be recorded;

second audio signal multiplexer means connected to said first and second left sound signal input terminals for time compressing, multiplexing and outputting two output signals of said first and second left sound signal input terminals when two input signals are to be recorded and for passing and outputting an output signal of said first left sound signal input terminal when one input signal is to be recorded;

recorder means connected to said output of said first audio signal multiplexer and said output of the second audio signal multiplexer for recording said output signals, said recorder means having a right sound signal output and a left sound signal output;

first audio signal demultiplexer means connected to said left sound signal output of said recorder means for passing and outputting an output of said left sound output of said recorder means when one of said input signals has been recorded, and demultiplexing and time expanding an output signal of said multiplexed signals from said left sound signal output of said recorder means when two of said input signals have been recorded;

second audio signal demultiplexer means connected to said right sound signal output of said recorder means for passing and outputting an output of said right sound output of said recorder means when one of said input signals has been recorded, and demultiplexing and time expanding an output signal of said multiplexed signals from said right sound signal output of said recorder means when two of said input signals have been recorded;

left sound signal output means connected to said first left sound signal input terminal and said outputs of said first audio signal demultiplexer for passing and outputting in the recording mode an output signal of said first left sound signal input terminal and in the playback mode passing one of said two output signals of said first audio signal demultiplexer;

right sound signal output means connected to said first right sound signal input terminal and said outputs of said second audio signal demultiplexer for passing and outputting in the recording mode an output signal of said first right sound signal input terminal and in the playback mode passing one of said two output signals of said second audio signal demultiplexer;

a left sound signal output terminal connected to said output of said left sound signal output means; and a right sound signal output terminal connected to said output of said right sound signal output means.

* * * * *